United States Patent
Gueron et al.

(10) Patent No.: US 8,127,363 B2
(45) Date of Patent: *Feb. 28, 2012

(54) METHOD AND APPARATUS FOR BOOTING A PROCESSING SYSTEM

(75) Inventors: Shay Gueron, Haifa (IL); Konstantin Levit-Gurevich, Kiryat Byalik (IL); Boaz Ouriel, Zichron-Yaacov (IL); Israel Hirsh, Kiryat-Motzkin (IL)

(73) Assignee: Intel Corporation, Santa Clara, CA (US)

( * ) Notice: Subject to any disclaimer, the term of this patent is extended or adjusted under 35 U.S.C. 154(b) by 1097 days.

This patent is subject to a terminal disclaimer.

(21) Appl. No.: 11/964,644

(22) Filed: Dec. 26, 2007

(65) Prior Publication Data

US 2009/0172377 A1 Jul. 2, 2009

(51) Int. Cl.
*G06F 7/04* (2006.01)
(52) U.S. Cl. .............. 726/26; 726/27; 713/1; 713/2; 713/187; 713/189; 718/1
(58) Field of Classification Search .............. 713/1, 2; 726/26, 27
See application file for complete search history.

(56) References Cited

U.S. PATENT DOCUMENTS

| 7,865,712 | B2 | 1/2011 | Levit-Gurevich et al. | |
|---|---|---|---|---|
| 2004/0177269 | A1* | 9/2004 | Belnet et al. | 713/200 |
| 2005/0091496 | A1* | 4/2005 | Hyser | 713/175 |
| 2006/0150256 | A1* | 7/2006 | Fanton et al. | 726/27 |

* cited by examiner

*Primary Examiner* — Taghi Arani
*Assistant Examiner* — Jason Lee
(74) *Attorney, Agent, or Firm* — Trop, Pruner & Hu, P.C.

(57) ABSTRACT

Machine-readable media, methods, apparatus and system for booting a processing system are described. In an embodiment, whether to launch an open operating system or a closed operating system to boot a processing system may be determined. A key may be retrieved from a processor register of the processing system and used to decrypt an encrypted version of the closed operating system based at least in part on a determination of booting the processing system with the closed operating system. In another embodiment, the processor register stored with the key may be flushed based at least in part on a determination of booting the processing system with the open operating system.

6 Claims, 3 Drawing Sheets

METHOD AND APPARATUS FOR BOOTING A PROCESSING SYSTEM

BACKGROUND

For a processing system installed with multiple operating systems (OSs), a boot sequence may be used to boot the processing system, which may bring up one of the multiple operating systems while other operating systems are in a shutdown state. To switch from a running OS to a shutdown OS, normally the running OS is shut down, the processing system is rebooted and the second OS may be selected during the boot.

The operating systems that may be selected during boot may be of two types: an open operating system and a closed operating system. The open operating system may allow a user to install and run software executing at a system privileged level. The closed operating system conversely may allow only specific usages and limit interactions with the user so that the user can not install and run software executing at the system privileged level. For example, in a closed system a user could be prevented from installing new applications or drivers, or from explicitly accessing OS services. Therefore, the closed operating system may run an application containing secrets, such as a multi-media application.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for booting a processing system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
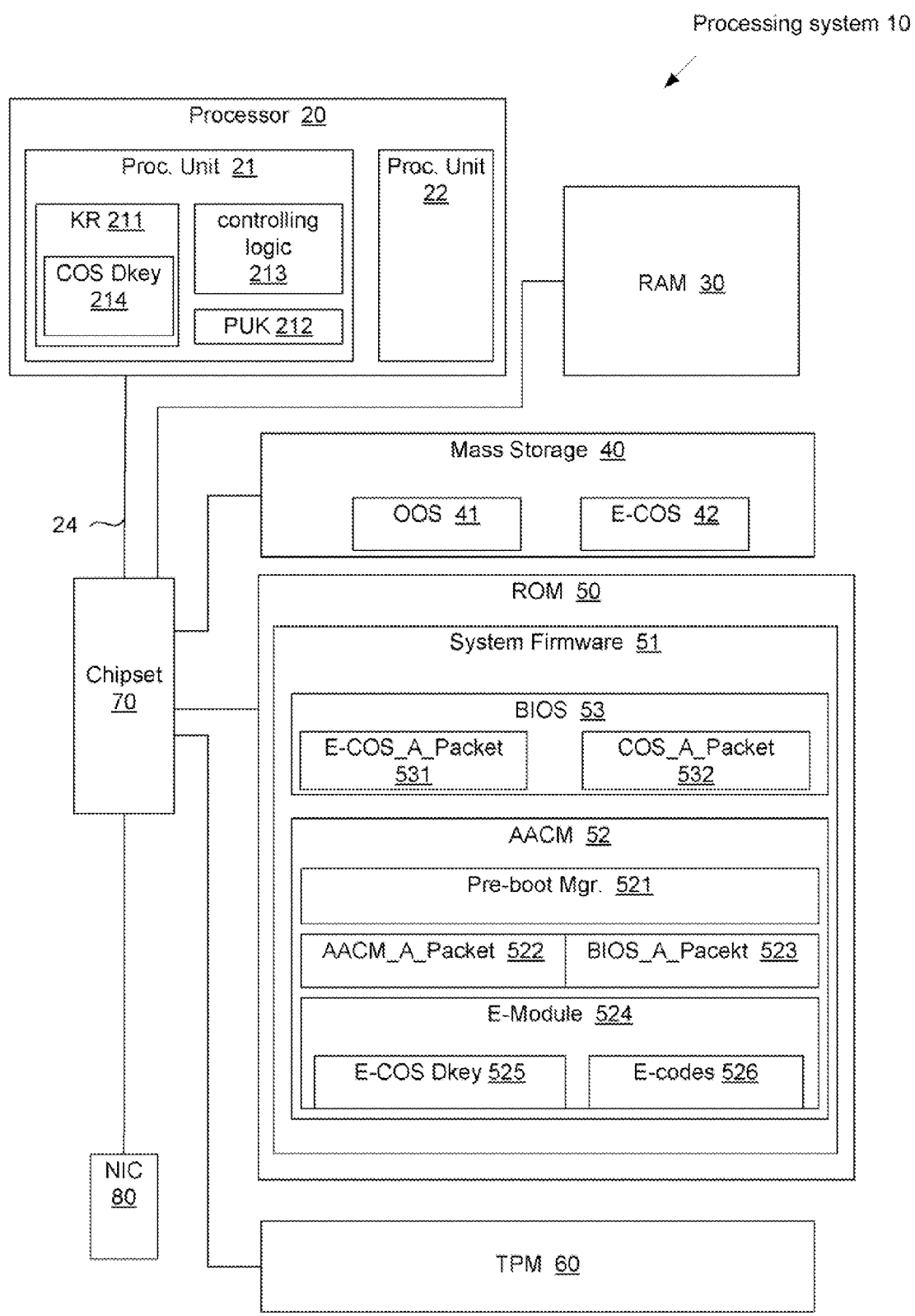
FIG. 1 illustrates an embodiment of a processing system.

FIG. 1 shows an embodiment of a processing system 10. Examples of processing system 10 may include distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 10 may comprise various hardware components, such as processor 20, communicatively coupled to various other components via one or more system buses 24 or other communication pathways or mediums. For example, processor 20 may be communicatively coupled to one or more volatile or nonvolatile data storage devices, such as RAM 30, mass storage devices 40 such as hard drives, and/or other state preserving devices or media, and read-only memory (ROM) 50. For purposes of this disclosure, the term "ROM" may be used in general to refer to nonvolatile memory devices such as programmable ROM (PROM), erasable programmable ROM (EPROM), electrically erasable programmable ROM (EEPROM), flash ROM, flash memory, etc.

In the embodiment of FIG. 1, processing system 10 may further include a Trusted Platform Module (TPM) 60 as a security coprocessor. Processor 20, RAM 30, TPM 60, and other components may be connected to a chipset 70. Chipset 70 may include one or more bridges or hubs for communicatively coupling system components, as well as other logic and storage components. In other embodiments, other types of security coprocessors may be used, or the security processor may be omitted. Processing system 10 may be controlled, at least in part, by input from an input device, such as a keyboard, a mouse, etc., and/or by directives received from another machine, biometric feedback, or other input sources or signals. Processing system 10 may utilize one or more connections to one or more remote data processing systems, such as through a network interface controller (NIC) 80, a modem, or other communication ports or couplings.

Processor 20 may include two or more processing units, such as processing unit 21 and processing unit 22. Alternatively, a processing system may include one or more processors each with at least one processing unit. The processing units may be implemented as processing cores, as Hyper-Threading (HT) technology, or as any other suitable technology for executing multiple threads simultaneously or substantially simultaneously.

Processing unit 21 may comprise or be communicatively coupled with a key register 211, a public key (PUK) 212, and a controlling logic 213. Key register 211 may be a special internal register, e.g., a 256-bit wide register. In one embodiment, only microcodes can operate key register 211, e.g., reading/writing data or codes from/to key register 211, and no architectural instructions can implicitly operate key register 211, e.g., via the processor that operates with the microcodes, except a specific architectural instruction such as DECRYPT_AND_FLUSH which will be described in great details below. In this embodiment, the specific architectural instruction can not expose the data or codes from key register 211 to a user. In another embodiment, data or codes can not be copied from key register 211 into any other registers or memories. In another embodiment, key register 211 is an execute_once_then_flush register. More specifically, key register 211 may be flushed after the data or codes are executed once. It will be appreciated these are exemplary embodiments and embodiments may selectively incorporate various disclosed features.

In an embodiment, key register 211 may store a closed operating system decrypt key (COS Dkey) 214 used to decrypt an encrypted version of a closed operating system. PUK 212 may be a public key used to decrypt an encrypted part of an augmented authentication code module (AACM) 52 copied from system firmware 51 upon a system reset, that is, E-module 524 that may comprise an encrypted version of the COS Dkey (i.e., E-COS Dkey 525) and an encrypted version of codes operating key register 211 (i.e., E-codes 526). Although the PUK may be considered a "public" key, it may also be kept secret, such that its value is never released by processing unit 21.

Controlling logic 213 may control the usage of PUK 212 and COS Dkey 214. Further, controlling logic 213 may control the execution of codes copied from AACM 52.

Mass storage 40 may store various software images, such as an open operating system (OOS) 41 and an encrypted version of a closed operating system (E-COS) 42. The open operating system may allow a user to install and run software executing at a system privileged level. The closed operating system may allow specific usages and limit interactions with the user so that the user can not install and run software executing at the system privileged level.

ROM 50 may be installed with a system firmware 51 comprising AACM 52 and basic input output system (BIOS) 53. AACM 52 may include a pre-boot manager 521 that may cause processing system 10 to authenticate BIOS image 53 before allowing it to run. AACM 52 may further include data packets useful for authentications of software images before allowing them to run, such as an AACM authentication packet (AACM_A_Packet 522) for AACM authentication, and a BIOS authentication packet (BIOS_A_Packet 523) for BIOS authentication.

In addition, AACM 52 may include the encrypted module (E-module 524) having the encrypted version of the COS DKey (E-COS Dkey 525) and the encrypted version of the codes operating key register 211 (E-codes 526), for example, codes for writing COS Dkey 214 to key register 211 and/or flushing key register 211. The codes may be formed at least in part with microcodes.

In an embodiment, AACM_A_Packet 522 may include a digital signature for AACM 52 generated by an AACM private key, and an AACM public key associated with the AACM private key. Authentication may be achieved through use of the digital signature. For instance, the processor may calculate a hash of the AACM 52 and use the result to validate the signature. The processor may only initialize processor state or execute the AACM code if it passes authentication.

In an embodiment, BIOS_A_Packet 523 may include a batch bound signature (BBS), a BBS key to authenticate the BBS, and a batch identifier (BatchID) to identify a particular batch which may include a set of components or devices with each device having an ID. BBS is a digital signature associated with a batch of devices and a message, such that the signature can be authenticated by devices which belong to that batch, but the signature cannot be authenticated by devices which do not belong to that batch. For example, a BBS on a message M, which is bound to a batch identified by BatchID, may be implemented as a signature on M ∥ BatchID (where "∥" denotes concatenation). In an embodiment, the above devices may be processors.

Also, "batch bound authentication" (BBA) is the process of authenticating a BBS. When a device whose ID equals X performs BBA on an input BBS, the device may perform a procedure that consists of authenticating the message and verifying that X is in the associated batch. For purposes of this disclosure, the "message manager" is the entity that provides the message that needs to be authenticated by the device, and the "batch manager" is the entity that provides the BatchID.

A variety of different techniques may be used for creating and authenticating BBS.

Shared-Secret-Based BBA

One approach may use a message authentication code (MAC) such as a hashed message authentication code (HMAC) which has the form $$HMAC_K(m)=h((K\ xor\ opad)\|h((K\ xor\ ipad)\|m))$$

where m is the message or data to be protected, h is the hashing function, K is a platform key (e.g., a key stored in TPM 60), ipad is a predefined inner pad constant, and opad is a predefined outer pad constant.

For instance, an Original Equipment Manufacturer (OEM) may compute a hash (H) of the approved BIOS image for a processing system. The OEM may also acquire a BatchID to cover the processor (or processors) having an identifier X for the processing system from a batch manager (e.g., from a processor manufacturer). The OEM may then use a secret key "SKey" to generate BBS=HMAC(H ∥ BatchID), using any suitable HMAC algorithm. The OEM may then send SKey, BBS, and BatchID to the batch manager (e.g., the processor manufacturer), as indicated above. The SKey may serve as the BBS Key.

The processor manufacturer may then create a data module (e.g., an AACM) that facilitates secure loading of SKey (and optionally BatchID) into a device such as a processor. In an embodiment, that data module is loaded into the processor dynamically, such as on reset. In an alternative embodiment, that data module may be loaded into the processor permanently.

When the processor manufacturer receives SKey, BBS, and BatchID from the OEM, the processor manufacturer may first verify that BatchID matches a batch assigned to that OEM. The processor manufacturer may then embed BIOS_A_Packet 523 having the SKey, BBS, and BatchID into AACM module 52. The processor manufacturer may also load pre-boot manager 521 into AACM 52. The processor manufacturer may then send AACM 52 to the OEM.

The OEM may install the AACM in the computer system, along with a processor with the identifier "X" belonging to BatchID. As indicated above, the AACM may include the BBS. The OEM may then ship the computer system to a user.

After the AACM has been installed, boot processes for the processing system may involve processor X performing BBA, using the SKey and the HMAC algorithm. For example, processor 20 may load and run pre-boot manager 521 from AACM 52. Pre-boot manager 521 may then determine whether X is in BatchID. Pre-boot manager 521 may also compute a hash (H') of the current BIOS image 53 in the computer system. Pre-boot manager 521 may then use the BBS Key, BatchID, and H' to compute BBS'=HMAC(H' || BID).

Pre-boot manager 521 may then compare BBS' against the BBS from BIOS_A_Packet 523. If X is in the BatchID and BBS' matches BBS, pre-boot manager 521 may conclude that the BBA was successful, and may therefore allow BIOS 53 to proceed a boot process. Otherwise, pre-boot manager 521 may displaying, logging, and/or transmitting an appropriate error message.

Public-Key-Based BBA

An alternative method for creating and authenticating BBSs may be based on public keys. For instance, as for the process described above, an OEM may compute a hash "H" of the approved BIOS image for a computer system, acquire a BatchID from the processor manufacturer, and then send H and BatchID to the processor manufacturer. The processor manufacturer may then verify that BatchID belongs to a batch provided to that OEM. After successful verification, the processor manufacturer may compute a signed message "MSigned"=PublicKeySign(H || BatchID), using the processor manufacturer's private key "PrivKey." In this approach, batch managers may use RSA or any other suitable public key scheme to compute MSigned. The processor manufacturer may then embed BIOS_A_Packet 523 having the corresponding public key "PubKey," MSigned, and BatchID in AACM 52, which is returned to the OEM. Consequently, PubKey serves as the BBS Key, and MSigned serves as the BBS.

The OEM then embeds AACM 52 in the processing system with a processor from BatchID and ships the processing system to a user. Thereafter, when the processing system is started or reset, the processor loads AACM 52 and runs pre-boot manager 521 from the AACM prior to jumping to the BIOS code. When pre-boot manager 521 runs, it may verify that the identifier for the current processor is in BatchID. Pre-boot manager 521 may also compute a hash (H') of the current BIOS image, and may use PubKey to compute M=PublicKeyDecrypt(MSigned). Pre-boot manager 521 may then compare H' || BatchID against M. Upon successful completion of the above operations, pre-boot manager 521 may conclude that the BBA was successful, and may therefore allow BIOS 53 to proceed the boot process. Otherwise, pre-boot manager 521 may display, log, and/or transmit an appropriate error message.

Although the embodiments of authenticating AACM 52 and BIOS 53 have been described above, it should be appreciated that other technologies may be applied for the authentications which should fall into the scope defined by the attached claims. For example, similar technology for authenticating BIOS 53 may be used to authenticate AACM 52. For another example, similar technology for authenticating BIOS 53 may be used to authenticate AACM 52.

E-module 524 of AACM 52 may be decrypted by PUK 212 from processor 21, to provide COS Dkey 214 and the codes operating key register 211. In an embodiment, E-module 524 may be decrypted upon the processing system is reset and AACM 52 are copied to an internal memory of processor 21. In an alternative embodiment, E-module 524 may be decrypted further upon AACM 52 is determined to be authentic by processor 21, for example, by using AACM_A_Packet 522. The codes operating key register 211 may copy COS Dkey 214 to key register 211 upon AACM 52 is determined to be authentic and thus executed by processor 21. Alternatively, the codes may copy COS Dkey 214 to key register 211 further upon pre-boot manager 521 determines that BIOS 53 is authentic, for example, by using BIOS_A_Packet 523.

BIOS 53 may test and prepare the processing system 10 for operation by querying its configuration settings. BIOS 53 may then load an operating system (e.g., the open operating system or the closed operating system) and pass control to it. Besides a boot sequence, BIOS 53 may further function to control device drivers, for example, it may control requests from the drivers as well as the application programs.

BIOS 52 may comprise an E-COS authentication packet (E-COS_A_Packet 531) to authenticate the encrypted version of the closed OS (E-COS 42) and/or COS authentication packet (COS_A_Packet 532) to authenticate the closed OS in order to ensure a secured boot of the closed OS, for example, to ensure that the encrypted version of the closed OS and/or the closed OS has not been modified by an attacker prior to booting the closed OS. Many technologies may be applied to authenticate the encrypted version of the closed OS and/or the closed OS, for example, the technology similar with that for authenticating the AACM or the technology similar with that for authenticating the BIOS, as stated above.

In an embodiment, upon a system reset, processor 21 may flush key register 211. Processor 21 may further copy AACM 52 from ROM 50 to its internal memory and authenticate AACM 52 (e.g., to determine whether AACM 52 has been modified by an attacker), for example, by using AACM_A_Packet 522. In response that AACM 52 is authentic, processor 21 may use PUK 212 to decrypt E-module 524 of AACM 52 to provide COS Dkey 214 and the codes operating key register 211. In response that AACM is not authentic, processor 21 may flush key register 211 and stop the process without processing system 10 booting. Alternatively, processor 21 may flush key register 211 and initiate a non-ACM boot by jumping to BIOS codes.

Upon the determination that AACM 52 is authentic, processor 21 may jump to AACM 52 so that AACM 52 may execute pre-boot codes to copy COS Dkey 214 to key register 211 and authenticate system BIOS 53 (e.g., to determine whether BIOS 53 has been modified by an attacker), for example, by using BIOS_A_Packet 523. In an embodiment, COS Dkey 214 may be copied to key register 211 before authenticating BIOS 53. In an alternative embodiment, COS Dkey 214 may be copied to key register 211 after BIOS 53 is determined to be authentic.

In response that BIOS 53 is authentic, processor 21 may jump to the BIOS code for the system boot. In response that BIOS 52 is not authentic, AACM 52 may flush key register 211 with the codes operating key register 211 and stop the process without processing system 10 booting. Alternatively, AACM 52 may flush key register 211 and allow the BIOS to perform regular sequences.

During the system boot, BIOS 53 may determine whether to boot an open OS or a closed OS. In response to the open OS, BIOS 53 may instruct processor 21 to flush key register 211, for instance, by using an instruction DECRYPT_AND_FLUSH. DECRYPT_AND_FLUSH is a specific architectural instruction that may operate the value from key register 211 without exposing the value to a user. In an embodiment, operand of the instruction may include NUM XXXX/YYYY respectively representing NUM=number of bits read from key register 211, XXXX=a memory location of an encrypted text and YYYY=a memory location of a decrypted text. For example, DECRYPT_AND_FLUSH with NUM=0 may be a flush instruction to flush key register 211. For another example, DECRYPT_AND_FLUSH with NUM=a (a≠0) may instruct to decrypt an encrypted text having NUM bits starting from the memory location XXXX and store the decrypted text to the memory location YYYY, and then flush key register 211. Then, BIOS 53 may launch the open OS in RAM 30 and pass control to the open OS.

In response to the closed OS, BIOS 53 may authenticate E-COS 42 (e.g., to determine whether E-COS 42 has been modified by an attacker), for example, by using E-COS_A_Packet 531. In response that E-COS 42 is not authentic, BIOS 53 may flush key register 211, for example, by using the DECRYPT_AND_FLUSH instruction with NUM=0, and stop the process without processing system 10 booting, for example, shutting down processing system 10.

In response that E-COS 42 is authentic, BIOS 53 may issue an instruction, for example, the DECRYPT_AND_FLUSH instruction with NUM≠0 to decrypt E-COS 42. Upon receiving the instruction, processor 21 may read COS Dkey 214 from key register 211, use COS Dkey 214 to decrypt E-COS 42 and flush key register 211. Then, BIOS 53 may authenticate the decrypted text, i.e., the closed OS (e.g., whether the closed OS has been modified by an attacker), for example, by using COS_A_Packet 532.

In response that the closed OS is authentic, BIOS 53 may launch the closed OS in RAM 30 and pass control to the closed OS. In response that the closed OS is not authentic, BIOS 53 may stop the process without processing system 10 booting, for example, shutting down processing system 10.

The above process may be repeated upon a decision of switching to a different OS.

Many technologies may implement other embodiments for processing system 10. In an embodiment, AACM 52 may further store an encrypted version of a platform key specific to an OEM of processing system 10. The same platform key may be stored in TPM 60 when manufacturing the processing system. Upon the system reset, processor 21 may decrypt the encrypted version of the platform key with a processor key and install the platform key into a processor register so that a secured session may be built between the processor and TPM through the platform key. In another embodiment, pre-boot manager 521 may be formed at least in part with microcodes and enclosed within AACM 52 in an encrypted version. In that case, processor 21 may decrypt the encrypted version of pre-boot manager 521 before executing the microcodes. In another embodiment, one or more of the above-stated authentications may be modified or omitted, for example, the AACM authentication may be omitted so that the AACM module may be deemed as authentic automatically.

It will be appreciated these are exemplary embodiments and embodiments may selectively incorporate various disclosed features.

Figure 2:
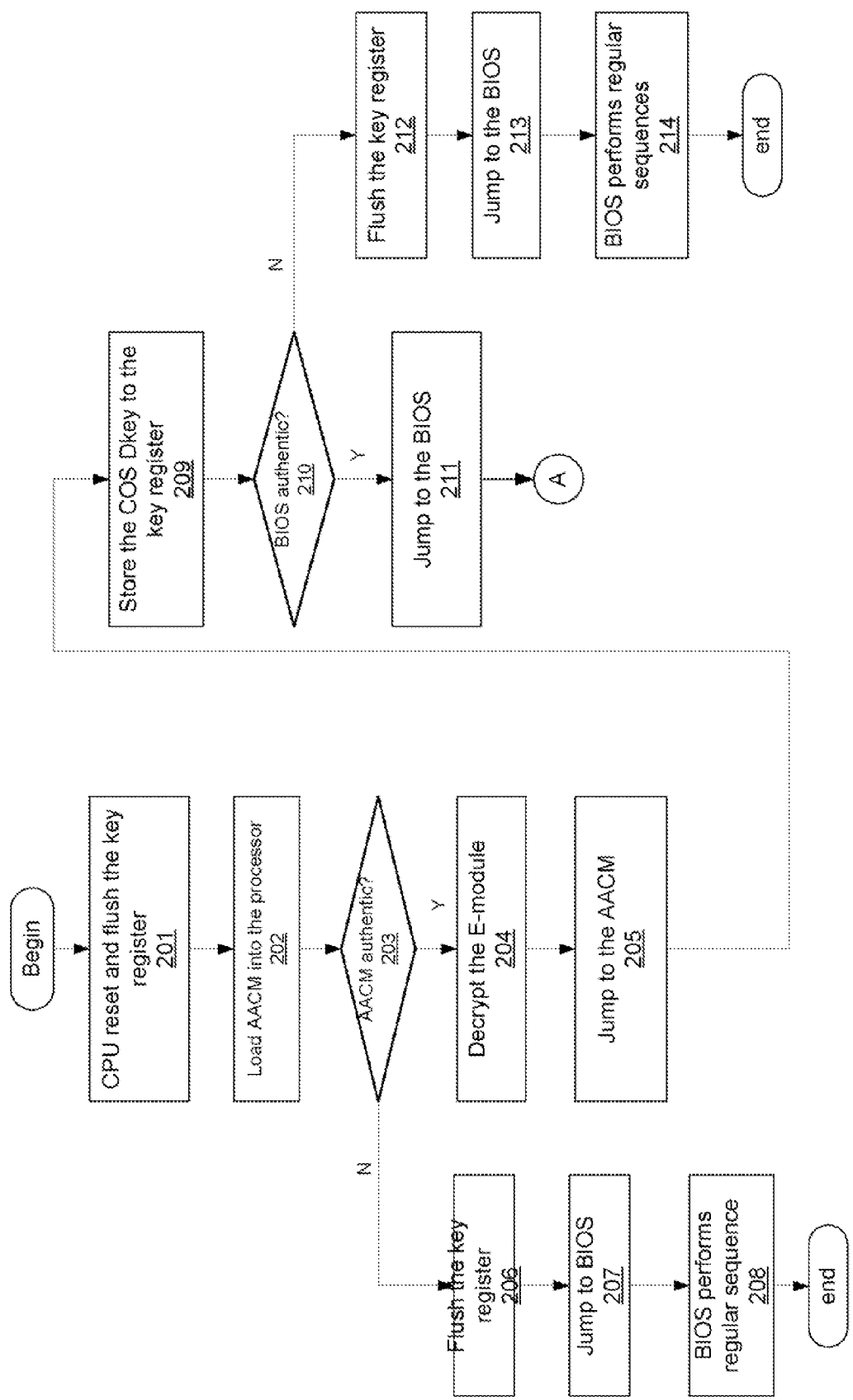
FIG. 2 and FIG. 3 illustrate an embodiment of a method of booting the processing system.
Figure 3:
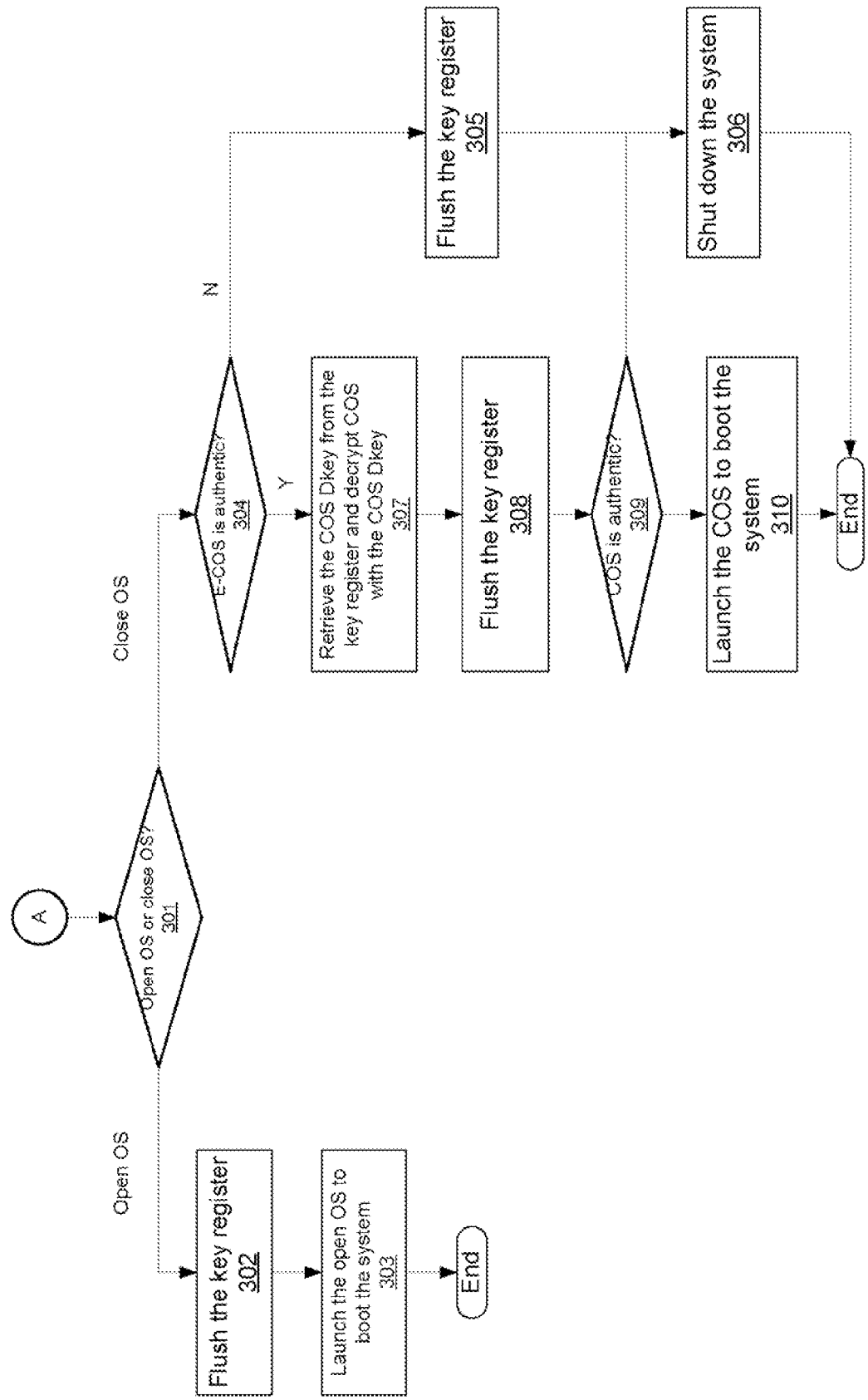

FIGS. 2 and 3 illustrate an embodiment of a method of booting the processing system. In block 201, upon a system reset, processor 21 may flush key register 211. In block 202, processor 21 may load AACM 52 to its internal memory. In block 203, processor 21 may determine whether AACM 52 is authentic, for example, by using AACM_A_Packet 522. In response that AACM 52 is not authentic, processor 21 may optionally flush key register 211 in block 206. In block 207, processor 21 may initiate a non-ACM boot, namely, jump to BIOS codes 53 without executing the pre-boot codes so that BIOS 53 may perform its regular sequence to boot processing system 10 in block 208. Alternatively, processor 21 may determine whether non-ACM boot is allowed and jump to BIOS codes 53 if non-ACM boot is allowed, otherwise the process may end without processing system 10 booting.

In response that AACM 52 is authentic, processor 21 may retrieve E-module 524 comprising E-COS Dkey 525 and E-codes 526 from AACM 52 and decrypt E-module 524 with PUK 212 to provide COS Dkey 214 and codes operating key register 211 in block 204. Then, processor 21 may jump to the AACM codes in block 205.

In block 209, the codes operating key register 211 may copy COS Dkey 214 to key register 211. In block 210, pre-boot manager 521 may determine whether BIOS 53 is authentic, for example, by using BIOS_A_Packet 523. In response that BIOS 53 is authentic, pre-boot manager 521 may jump to BIOS codes to proceed the boot process in block 211, otherwise, the codes operating key register 211 may flush key register 211 so that COS Dkey 214 may be deleted from key register 211 in block 212 and jump to BIOS codes in block 213 so that BIOS 53 may perform its regular sequence to boot processing system 10 in block 214. Alternatively, pre-boot manager 521 may stop the process without processing system 10 booting.

In block 301, BIOS 53 may determine whether to launch an open OS or a closed OS to boot the system. In response to the open OS, BIOS 53 may issue an instruction, such as the above-stated DECRYPT_AND_FLUSH NUM 0 instruction, to flush key register 211 in block 302. Then, BIOS 53 may launch open OS 41 loaded from mass storage 40 to RAM 30 to boot the system, in block 303.

In response to the closed OS, BIOS 53 may determine whether E-COS 42 is authentic or not, for example, by using E-COS_A_Packet 531, in block 304. In response that E-COS 42 is not authentic, BIOS 53 may issue an instruction, for example, DECRYPT_AND_FLUSH NUM=0 instruction, to flush key register 211 in block 305. In block 306, BIOS 53 may end the process without processing system 10 booting, such as shutting down processing system 10.

In response that E-COS 42 is authentic, BIOS 53 may issue an instruction to instruct processor 21 to read COS Dkey 214 from key register 211 and decrypt E-COS 42 with COS Dkey 214 to provide the closed OS in block 307. In block 308, BIOS 53 may instruct processor 21 to flush key register 211. For example, BIOS 53 may use the above-stated DECRYPT_AND_FLUSH NUM XXXX/YYYY instruction for those operations. In block 309, BIOS 53 may determine whether the closed OS is authentic or not, for example, by using COS_A_Packet 532.

In response that the closed OS is authentic, BIOS 53 may launch the closed OS in RAM 30 and transfer the control of the processing system to the closed OS, in block 310. In response that the closed OS is not authentic, BIOS 53 may end the process without processing system 10 booting, such as shutting down processing system 10, in block 306.

Many technologies may implement other embodiments for the method of booting processing system 10. In an embodiment, processor 21 may store COS Dkey 214 in key register 211 upon a determination that BIOS 53 is authentic. In another embodiment, the process may omit some blocks for key register 211 flushing, for example, block 206.

It will be appreciated these are exemplary embodiments and embodiments may selectively incorporate various disclosed features.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A non-transitory machine-readable medium comprising a plurality of instructions that if executed, result in a system:

determining whether to launch an open operating system or a closed operating system to boot a processing system;

retrieving a key from a processor register of the processing system and decrypting an encrypted version of the closed operating system with the key, based at least in part on a determination of booting the processing system with the closed operating system; and flushing the processor register based at least in part on a determination of booting the processing system with the open operating system.

2. The non-transitory machine readable medium of claim 1, wherein the plurality of instructions further result in the system, flushing the processor register after decrypting the encrypted version of the closed operating system with the key.

3. The non-transitory machine readable medium of claim 1, wherein the plurality of instructions further result in the system:

determining whether the encrypted version of the closed operating system is authentic; and flushing the processor register if the encrypted version of the closed operating system is not authentic.

4. The non-transitory machine readable medium of claim 3, wherein said retrieving the key from the processor register and decrypting the encrypted version of the closed operating system with the key are performed further based on a determination that the encrypted version of the closed operating system is authentic.

5. The non-transitory machine readable medium of claim 1, wherein the plurality of instructions further result in the system:

determining whether the closed operating system is authentic; and booting the processing system with the closed operating system if the closed operating system is authentic.

6. The non-transitory machine readable medium of claim 5, wherein the plurality of instructions further result in the system, shutting down the processing system if the closed operating system is not authentic.

* * * * *